United States Patent
Wu et al.

(10) Patent No.: US 12,505,361 B2
(45) Date of Patent: Dec. 23, 2025

(54) SYSTEM AND METHOD FOR PREDICTING MANNED UNMANNED TEAMING (MUM-T) AUTONOMY OVERRIDES

(71) Applicant: Raytheon Company, Waltham, MA (US)

(72) Inventors: Peggy Wu, Ellicott City, MD (US); Brett W. Israelsen, Glastonbury, CT (US); Andrew J. Radlbeck, South Glastonbury, CT (US); Gianna Avdic McIntire, Henderson, NV (US); Katharine G. Woodruff, Ames, IA (US)

(73) Assignee: Raytheon Company, Arlington, VA (US)

( * ) Notice: Subject to any disclaimer, the term of this patent is extended or adjusted under 35 U.S.C. 154(b) by 1030 days.

(21) Appl. No.: 17/538,659

(22) Filed: Nov. 30, 2021

(65) Prior Publication Data
US 2023/0169365 A1  Jun. 1, 2023

(51) Int. Cl.
*G06N 5/04* (2023.01)
*G06Q 10/04* (2023.01)

(52) U.S. Cl.
CPC ............... *G06N 5/04* (2013.01); *G06Q 10/04* (2013.01)

(58) Field of Classification Search
CPC .................................. G06N 5/04; G06Q 10/04
See application file for complete search history.

(56) References Cited

U.S. PATENT DOCUMENTS

| | | | |
|---|---|---|---|
| 2014/0278031 A1* | 9/2014 | Scofield | G01C 21/3461 701/118 |
| 2017/0010108 A1 | 1/2017 | Shashua | |
| 2017/0217445 A1 | 8/2017 | Tzirkel-Hancock et al. | |
| 2017/0344010 A1* | 11/2017 | Rander | G06Q 10/08 |
| 2018/0031264 A1* | 2/2018 | Atchison | F24F 11/62 |
| 2018/0178808 A1 | 6/2018 | Zhao et al. | |
| 2019/0092337 A1* | 3/2019 | Chua | B60W 30/14 |
| 2019/0196464 A1 | 6/2019 | Lockwood et al. | |
| 2019/0206563 A1 | 7/2019 | Shelton, IV et al. | |
| 2020/0125090 A1 | 4/2020 | Hoye | |
| 2020/0192359 A1 | 6/2020 | Aragon et al. | |
| 2021/0132634 A1 | 5/2021 | Groden et al. | |
| 2021/0160326 A1 | 5/2021 | Saxena et al. | |
| 2021/0240190 A1* | 8/2021 | Wray | G06F 40/186 |
| 2021/0304038 A1 | 9/2021 | Hazard et al. | |

OTHER PUBLICATIONS

Bechara, et al., "Deciding Advantageously Before Knowing the Advantageous Strategy", http://www.sciencemag.org, Science, vol. 275, Feb. 28, 1997. 3 pgs.

(Continued)

*Primary Examiner* — Sohana Tanju Khayer (57) ABSTRACT

A method includes obtaining multiple data items from multiple heterogeneous data sources including at least one sensor, where the multiple data items are related to operation of an autonomy. The method also includes processing the multiple data items using a machine learning model to determine a likelihood that an operator associated with the autonomy will override an action of the autonomy during the operation of the autonomy. The method further includes outputting the likelihood for review by a user.

20 Claims, 4 Drawing Sheets

(56) References Cited

OTHER PUBLICATIONS

Lee, et al., "Trust in Automation: Designing for Appropriate Reliance", Human Factors, vol. 46, No. 1, Spring 2004, pp. 50-80.
Schaefer et al., "Assessing Multi-Agent Human-Autonomy Teams: US Army Robotic Wingman Gunnery Operations", Proc. of SPIE, vol. 10982, May 2019, 20 pages.
Chiou et al., "Mixed-Initiative variable autonomy for remotely operated mobile robots", Oct. 2020, 26 pages.
International Search Report and Written Opinion of the International Searching Authority dated Nov. 28, 2022 in connection with International Patent Application No. PCT/US2022/075076, 10 pages.

* cited by examiner

SYSTEM AND METHOD FOR PREDICTING MANNED UNMANNED TEAMING (MUM-T) AUTONOMY OVERRIDES

GOVERNMENT RIGHTS

This invention was made with U.S. government support under contract number FA8650-20-C-7044 awarded by the U.S. Department of Defense. The U.S. government has certain rights in the invention.

TECHNICAL FIELD

This disclosure is generally directed to autonomous systems. More specifically, this disclosure is directed to a system and method for predicting manned unmanned teaming (MUM-T) autonomy overrides.

BACKGROUND

Autonomy complexity has led to systems performing complicated tasks with minimal human supervision. For high-risk tasks, humans remain "in the loop" to override autonomy if its behavior appears to be erratic. However, given that reasoning capabilities of advanced systems can exceed the cognitive capabilities of an operator, human operators can lack understanding of the autonomy's intent.

SUMMARY

This disclosure provides a system and method for predicting manned unmanned teaming (MUM-T) autonomy overrides.

In a first embodiment, a method includes obtaining multiple data items from multiple heterogeneous data sources including at least one sensor, where the multiple data items are related to operation of an autonomy. The method also includes processing the multiple data items using a machine learning model to determine a likelihood that an operator associated with the autonomy will override an action of the autonomy during the operation of the autonomy. The method further includes outputting the likelihood for review by a user.

In a second embodiment, a device includes at least one processor configured to obtain multiple data items from multiple heterogeneous data sources including at least one sensor, where the multiple data items are related to operation of an autonomy. The at least one processor is also configured to process the multiple data items using a machine learning model to determine a likelihood that an operator associated with the autonomy will override an action of the autonomy during the operation of the autonomy. The at least one processor is further configured to output the likelihood for review by a user.

In a third embodiment, a non-transitory computer readable medium contains instructions that when executed cause at least one processor to obtain multiple data items from multiple heterogeneous data sources including at least one sensor, where the multiple data items are related to operation of an autonomy. The medium also contains instructions that when executed cause the at least one processor to process the multiple data items using a machine learning model to determine a likelihood that an operator associated with the autonomy will override an action of the autonomy during the operation of the autonomy. The medium further contains instructions that when executed cause the at least one processor to output the likelihood for review by a user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As discussed above, autonomy complexity has led to systems performing complicated tasks with minimal human supervision. For high-risk tasks, humans remain "in the loop" to override autonomy if its behavior appears to be erratic. However, given that reasoning capabilities of advanced systems can exceed the cognitive capabilities of an operator, human operators can lack understanding of the autonomy's intent. For example, in manned-unmanned teams, increased autonomy often results in a human operator having decreased understanding of the autonomy's tasks or actions. This can lead to the operator misunderstanding at least parts of the machine intent and possibly overriding the autonomy. In the MUM-T domain, misunderstanding can result in an operator attempting to override autonomy, even if its suggested course of action will result in a better outcome. Conventional systems rely on testing systems for human machine interface designs and subsequent training of operators. Conventional systems lack the ability to predict human overrides during run-time.

This disclosure provides systems and methods for predicting MUM-T autonomy overrides. The disclosed systems and methods combine physiological and behavioral measures of an operator with contextual environmental information in a machine learning approach to predict the likelihood of the operator overriding the decisions of an autonomy. The disclosed systems and methods use a combination of supervised and unsupervised machine learning methods to analyze temporal measures of a human operator's behaviors and physiology. Measures are aggregated to generate a probability that the operator will override the actions of an autonomous system. Such measures can help predict weaknesses in an overall human and machine team by quantifying autonomy under-reliance.

Note that while this disclosure is often described with respect to autonomous and semi-autonomous vehicle systems, it will be understood that the principles disclosed here are also applicable to other types of scenarios. The disclosed embodiments can be used in conjunction with various applications that use autonomies, including airborne vehicles, terrestrial systems, defense-related applications, and the like.

Figure 1:
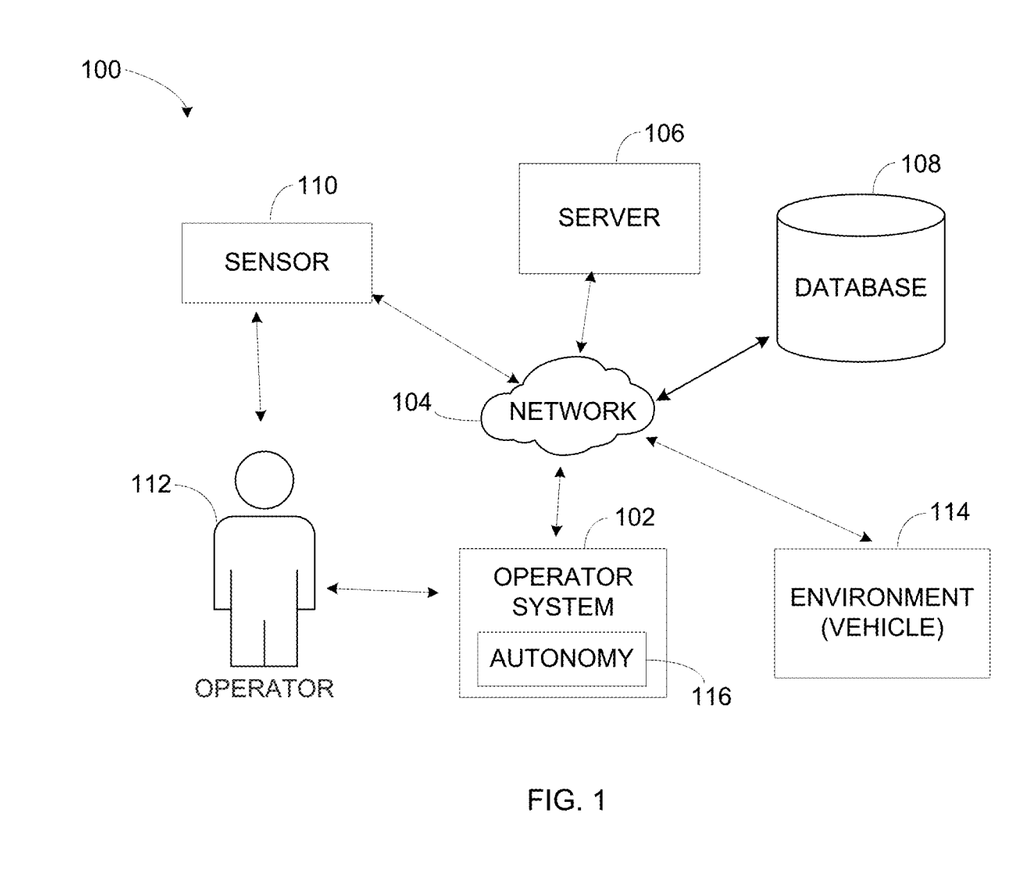
FIG. 1 illustrates an example system for predicting manned unmanned teaming (MUM-T) autonomy overrides according to this disclosure.

FIG. 1 illustrates an example system 100 for predicting manned unmanned teaming (MUM-T) autonomy overrides according to this disclosure. As shown in FIG. 1, the system 100 includes an operator system 102, a network 104, a server 106, a database 108, a sensor 110, a human operator 112, and an environment 114. Note, however, that other combinations, quantities, and arrangements of components may also be used here.

In this example, the operator system 102 is coupled to or communicates over the network 104. Communications between the operator system 102 and the network 104 may occur in any suitable manner, such as via a wired or wireless connection. The operator system 102 represents any suitable device or system used by the operator 112 to provide information to the server 106 or database 108 or to receive information from the server 106 or database 108. Example types of information may include inputs and outputs associated with one or more autonomies 116 (such as MUM-T autonomies) configured to perform one or more actions in the environment 114. In some embodiments, the one or more autonomies 116 are hosted at the operator system 102.

Any suitable number(s) and type(s) of operator system 102 may be used in the system 100. For example, the operator system 102 can represent a desktop computer, a laptop computer, a smartphone, a tablet computer, a control console in the environment 114 (such as a control console of an airborne vehicle or other manned system), or the like. In this particular example, the operator system 102 can include avionics, pilot controls, and the like. However, any other or additional types of operator systems may be used in the system 100. Each operator system 102 includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The server 106 is coupled to the network 104 and is coupled to or otherwise communicates with the database 108. The server 106 supports the retrieval of information from the database 108 and the processing of that information. Of course, the database 108 may also be used within the server 106 to store information, in which case the server 106 may store the information itself. Among other things, the server 106 processes information used in performing actions of the autonomy 116 and predicting autonomy overrides by the operator 112. The server 106 includes any suitable structure configured to predict autonomy overrides. In some embodiments, the server 106 includes one or more processors, one or more memories, and one or more communication interfaces. Note, however, that the server 106 may be implemented in any suitable manner to perform the described functions. Also note that while described as a server here, the device(s) actually implementing the server 106 may represent one or more desktop computers, laptop computers, server computers, or other computing or data processing devices or systems.

The database 108 stores various information used, generated, or collected by the server 106 and the operator system 102. For example, the database 108 may store inputs, outputs, and machine learning models associated with performing autonomy actions and predicting autonomy overrides.

The sensor 110 measures, detects, or otherwise senses a physical quantity or characteristic of the operator 112 or the environment 114 and converts the measured or detected information into electrical signals. For example, the sensor 110 can include one or more cameras or other imaging sensors. The sensor 110 can also include a gesture sensor, a gyroscope, an air pressure sensor, an accelerometer, a proximity sensor, a bio-physical sensor, a temperature sensor, an electromyography (EMG) sensor, an electroencephalogram (EEG) sensor, an electrocardiogram (EKG) sensor, an iris sensor, a fingerprint sensor, or the like. In some embodiments, the sensor 110 is worn by the operator 112. In other embodiments, the sensor 110 is coupled to or is otherwise a part of the operator system 102 or the environment 114.

The operator 112 represents a human operator that performs one or more skilled operations in the environment 114. For example, in some embodiments, the operator 112 is an aircraft pilot. In other embodiments, the operator 112 is a land vehicle driver. In still other embodiments, the operator 112 is a computer operator capable of performing simulations on the operator system 102.

The environment 114 represents one or more environmental objects on which the autonomy 116 may be automatically performed and overridden by the operator 112. For example, in some embodiments, the environment 114 is a manned aircraft piloted by the operator 112, who is a pilot. In other embodiments, the environment 114 is a land vehicle driven by the operator 112. In some cases, the environment 114 includes physical features surrounding a vehicle or aircraft, such as roads, atmosphere, terrain, and the like. One or more characteristics or properties of the operator 112 or the environment 114 can be measured by the sensor 110 and provided to the server 106.

There are a number of possible ways to implement the system 100 in order to provide the described functionality for predicting MUM-T autonomy overrides. For example, in some embodiments, the server 106 and database 108 are owned, operated, or managed by a common entity. In other embodiments, the server 106 and database 108 are owned, operated, or managed by different entities. Note, however, that this disclosure is not limited to any particular organizational implementation.

Although FIG. 1 illustrates one example of a system 100 for predicting MUM-T autonomy overrides, various changes may be made to FIG. 1. For example, the system 100 may include any number of operator systems 102, networks 104, servers 106, databases 108, sensors 110, operators 112, environments 114, and autonomies 116. Also, while FIG. 1 illustrates that one database 108 is coupled to the network 104, any number of databases 108 may reside at any location or locations accessible by the server 106, and each database 108 may be coupled directly or indirectly to the server 106. In addition, while FIG. 1 illustrates one example operational environment in which MUM-T autonomy overrides can be predicted, this functionality may be used in any other suitable system.

Figure 2:
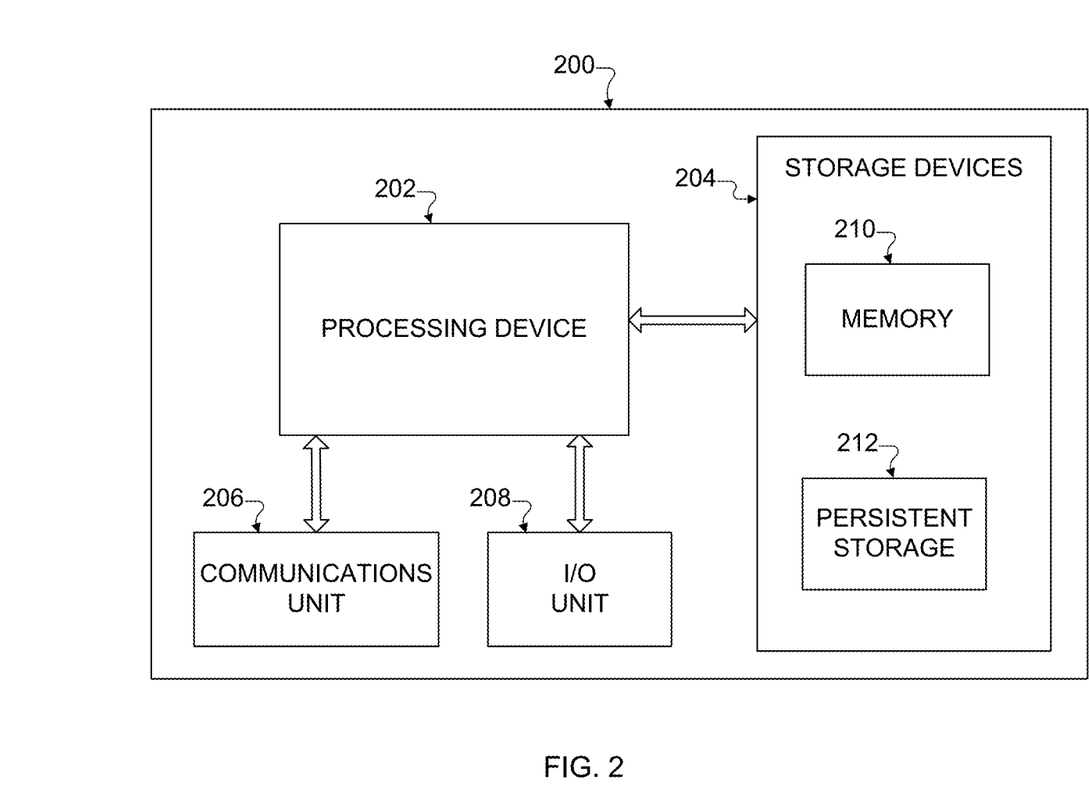
FIG. 2 illustrates an example device for predicting MUM-T autonomy overrides according to this disclosure.

FIG. 2 illustrates an example device 200 for predicting MUM-T autonomy overrides according to this disclosure. One or more instances of the device 200 may, for example, be used to at least partially implement the functionality of the server 106 of FIG. 1. However, the functionality of the server 106 may be implemented in any other suitable manner. Also, the same or similar arrangement of components may be used to at least partially implement the functionality of the operator system 102 in FIG. 1. However, the functionality of the operator system 102 may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 can be accessed remotely.

In some embodiments, the instructions executed by the processing device 202 can include instructions that implement the functionality of the server 106. For example, the instructions executed by the processing device 202 can include instructions for predicting MUM-T autonomy overrides.

Although FIG. 2 illustrates one example of a device 200 for predicting MUM-T autonomy overrides, various changes may be made to FIG. 2. For example, computing devices and systems come in a wide variety of configurations, and FIG. 2 does not limit this disclosure to any particular computing device or system.

Figure 3:
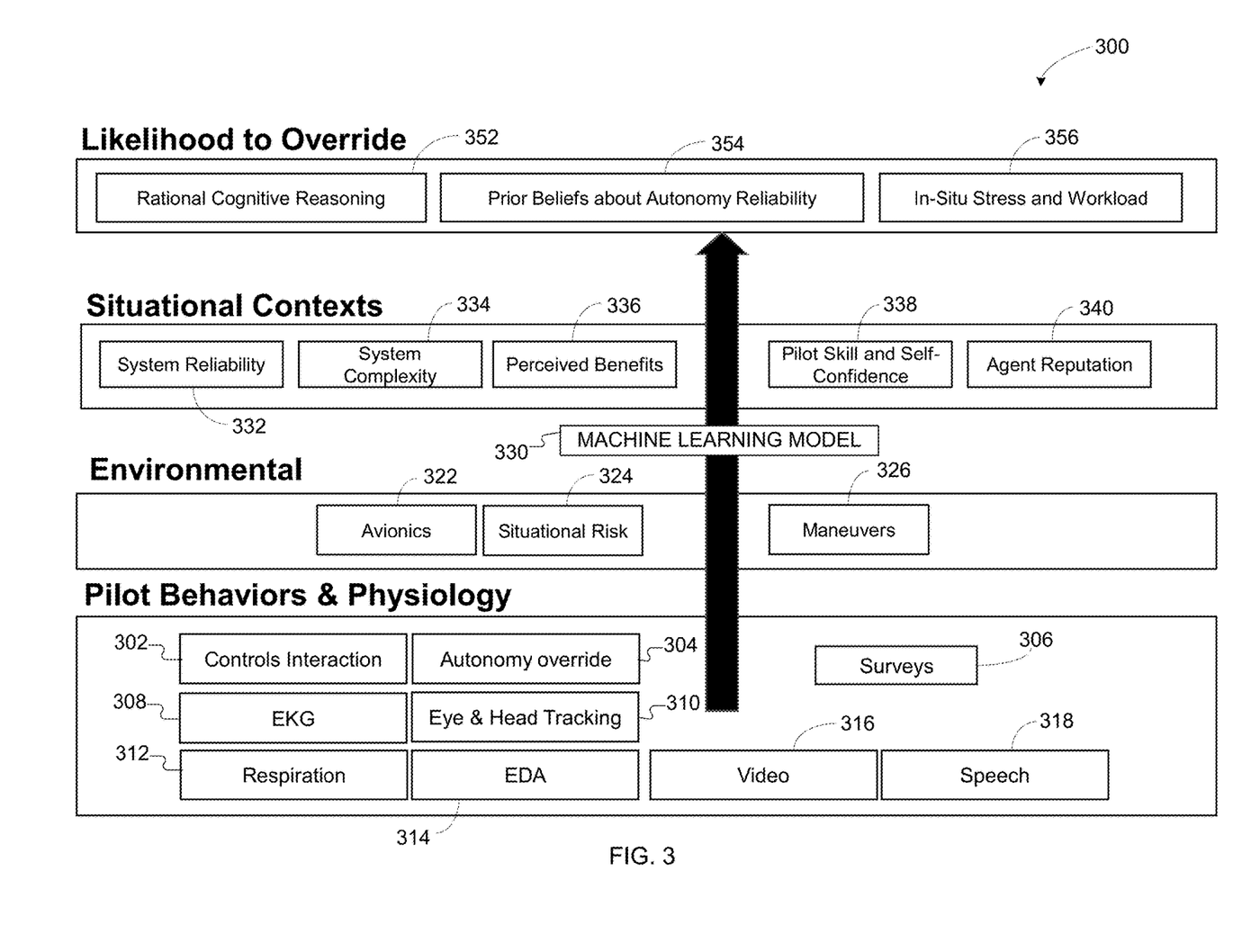
FIG. 3 illustrates an example framework for predicting MUM-T autonomy overrides according to this disclosure.

FIG. 3 illustrates an example framework 300 for predicting MUM-T autonomy overrides according to this disclosure. For ease of explanation, the framework 300 is described as being implemented using the system 100 of FIG. 1, which may include using one or more devices 200 of FIG. 2. However, the framework 300 may involve the use of any suitable device(s) in any suitable system(s).

As shown in FIG. 3, the framework 300 represents a framework in which one or more autonomies 116 perform multiple actions or operations, and an operator 112 may or may not override one or more of the actions or operations performed by the one or more autonomies 116. Depending on the embodiment, the operator 112 may monitor one autonomy 116 or multiple (possibly many) autonomies 116. For ease of explanation, the one or more autonomies 116 will now be referred to simply as the autonomy 116. For example, the operator 112 may be a pilot of a manned aircraft, and the autonomy 116 may be an autonomous co-pilot of the aircraft. As another example, the operator 112 may be the driver of a land vehicle, and the autonomy 116 may be an autonomous mode of the vehicle.

The framework 300 is used (such as by the server 106) to predict when and why the operator 112 may override an action of the autonomy 116. For example, the operator 112 may override the autonomy 116 because the operator 112 does not trust the actions of the autonomy 116, the operator 112 might think he or she can do a better job than the autonomy 116, or the operator 112 may simply have bandwidth to manually perform the operation that would be performed by the autonomy 116.

As shown in FIG. 3, the framework 300 includes multiple inputs 302-326 from various heterogeneous data sources. The inputs 302-326 can include operator behaviors and physiology inputs 302-318 and environmental inputs 322-326. The inputs 302-326 are provided to a machine learning (ML) model 330, which processes the inputs 302-326 to determine the likelihood that the operator 112 will override the autonomy 116. In some embodiments, the server 106 receives the inputs 302-326 in order to predict when and why the operator 112 may override an action of the autonomy 116.

The pilot behaviors and physiology inputs 302-318 represent information associated with the operator 112 and measured by one or more sensors 110. In some cases, the pilot behaviors and physiology inputs 302-318 can include one or more of the following inputs. Controls interaction 302 includes information regarding interactions between the operator 112 and the controls of an aircraft or other operator system 102. This can include, for example, detailed information about the operator 112 adjusting navigation controls during a bad weather event.

Autonomy override(s) 304 include(s) information related to past instances of an operator 112 overriding an autonomy 116 in the aircraft. This can include, for example, which autonomy 116 was overridden by which operator 112, what specific actions of the autonomy 116 were overridden by the operator 112, what were the circumstances during which the autonomy 116 was overridden by the operator 112, and the like.

Surveys 306 include information collected from the operator 112 to assist in machine learning. The information can be collected by surveying the operator 112 before, during, or after simulation exercises or real-world events in which an operator 112 may override an autonomy 116. The survey 306 may include questions, such as "How much do you trust the autonomy?" "What is your perceived amount of risk in this situation?" "For what reason did you override the autonomy a moment ago?" The answers to the questions can be used as labels for training data. For example, the labels can be associated with the pilot behaviors and physiology inputs 302-318 in the framework 300.

EKG 308 includes electrocardiogram (EKG) information of the operator 112 collected via a sensor 110, such as a sensor 110 connected to the operator's chest, while the operator 112 is piloting the aircraft or operating another system, observing or interacting with the autonomy 116, or a combination of these. Eye and head tracking 310 includes information tracking movement of the eyes or head of the operator 112 while the operator 112 is piloting the aircraft or operating another system, observing or interacting with the autonomy 116, or a combination of these. The information may be captured by one or more image sensors 110 (such as a camera) positioned near the operator 112. Respiration 312 includes respiration information of the operator 112 collected via a sensor 110, such as a sensor 110 connected to the operator's chest, while the operator 112 is piloting the aircraft or operating another system, observing or interacting with the autonomy 116, or a combination of these. EDA 314 includes electrodermal activity (EDA) (also referred to as galvanic skin response) information collected via a sensor 110, such as a sensor 110 attached to a wrist of the operator 112, while the operator 112 is piloting the aircraft or operating another system, observing or interacting with the autonomy 116, or a combination of these.

Video 316 and speech 318 include video and speech of the operator 112 while the operator 112 is piloting the aircraft or operating another system, observing or interacting with the autonomy 116, or a combination of these. The video 316 and speech 318 can be captured by one or more audio sensors and video sensors, such as a camera, microphone, or both disposed in the cockpit of the aircraft.

The environmental inputs 322-326 represent information associated with the environment 114 and measured by one or more sensors 110. In some cases, the environmental inputs 322-326 can include one or more of the following inputs. Avionics 322 include information output from electronic systems used in an aircraft or other system, such as communication, navigation, tactical systems, and the like, while the operator 112 is piloting the aircraft or operating the other system.

Situational risks 324 include events and conditions occurring around the operator 112 or in the environment 114 that may present a risk and what level of risk is presented. An example of an event may be a "dog fight" or aircraft combat between the operator 112 and an opponent or enemy. Here, the situational risks 324 can include information such as where an opponent is relative to the aircraft, what type of aircraft the opponent is in, what the capabilities/weapons of that aircraft are, and what risks does this event present. An example of a condition may be weather conditions (such as storms) in the flight path of the aircraft and what risks the condition presents.

Maneuvers 326 include information regarding actions or maneuvers of the aircraft or other system being operated that have occurred in the past, are presently occurring, or are planned to be performed. This may include, for example, unplanned changes in altitude, moves to evade or chase another aircraft, and the like.

Once the server 106 receives one, some, or all of the inputs 302-326, the server 106 uses the ML model 330 to process the inputs 302-326 and predict or determine the likelihood that the operator 112 will override the autonomy 116. The ML model 330 can include a random forest model, a regression model, a deep neural network (such as a convolutional neural network), or any other suitable ML model. In some embodiments, the ML model 330 can use predictive analytics to determine the likelihood that the operator 112 will override the autonomy 116.

In some embodiments, the ML model 330 generates multiple outputs, including situational contexts 332-340 and likelihoods to override 352-356. Situational contexts 332-340 are representations of the operator behaviors and physiology data, which are learned by the ML model 330. The situational contexts 332-340 provide context for the likelihoods to override 352-356. The likelihoods to override 352-356 represent reasons that the operator 112 would be likely to override the autonomy 116. For example, one likelihood to override might be most associated with the operator's prior beliefs about autonomy reliability 354. These beliefs may be informed by the system reliability 332 of the aircraft or other system being operated.

In some embodiments, the situational contexts 332-340 can include one or more of the following. System reliability 332 includes a representation of how reliable one or more systems of the aircraft (such as navigation, communications, and the like) or other operated system are in their operation. System complexity 334 includes a representation of how complex or complicated one or more systems of the aircraft (such as navigation, communications, and the like) or other operated system are in their operation. Perceived benefits 336 includes a combination of system reliability 332 and situational risk 324. For example, if the autonomy 116 determines that the autonomy 116 should perform a maneuver in view of a high situational risk 324 and the system reliability 332 to successfully perform the maneuver is high, the maneuver would have a high perceived benefit 336. Pilot skill and self-confidence 338 include information that indicates a measurement of the skill level and self-confidence of the operator 112, which can inform the operator's decision to override the autonomy 116. Some of the pilot skill and self-confidence 338 can be determined from one or more of the surveys 306. Agent reputation 340 includes information provided to the operator 112 about the autonomy 116 that might affect the operator's decision to override the autonomy 116. For example, this may include another pilot telling the operator 112 that the autonomy 116 does not make good decisions. In some embodiments, some or all of the agent reputation 340 can be determined from one or more of the surveys 306.

In some embodiments, the likelihoods to override 352-356 can include one or more of the following. Rational cognitive reasoning 352 includes the operator's likelihood to override because the operator 112 either understands or does not understand the strategy of the autonomy 116 while the autonomy 116 performs operations. Stated differently, this is an indication of how much the operator 112 understands what the autonomy 116 is doing. For example, if the autonomy 116 causes the aircraft or other operated system to change altitude to avoid an enemy or a weather situation, this indicates whether the operator 112 recognizes and understands the reasoning of the autonomy 116 in deciding to change altitude. Prior beliefs about autonomy reliability 354 includes the operator's likelihood to override because the operator 112 believes the autonomy 116 is reliable or not reliable. For example, if the operator 112 believes the autonomy 116 is not reliable, the operator 112 may be more likely to override the autonomy 116. In-situ stress and workload 356 includes the operator's current stress and workload levels and the effect that the stress or workload level has on the operator 112 to override to the autonomy 116. For example, if the operator 112 is very busy, the operator 112 may be less likely to scrutinize and override the actions of the autonomy 116.

In some cases, each of the likelihoods to override 352-356 can be represented as an individual metric, such as a scalar or vector quantity. These likelihoods to override 352-356 can also be aggregated or combined into a single metric, such as an aggregated scalar or vector quantity. The aggregation can be performed by averaging, weighted averaging, summing, or any other suitable algorithm or mathematically function.

In some embodiments, one or more of the outputs 332-356 of the ML model 330 can be presented to a user, such as on a graphical user interface or in a report. The user here may represent the operator 112, a manager assigned to the operator 112, an engineer working with or designing the autonomy 116, or any other suitable user.

In addition, depending on the outputs 332-356, it may be beneficial to present additional information to the operator 112 for increased understanding or training. For example, if it is predicted that the operator 112 is going to override the autonomy 116, the autonomy 116 may provide additional information to convince the operator 112 to not override or to make sure that the operator 112 is fully informed in making the decision to override. The ability to predict operator overrides provides the autonomy 116 with an opportunity to present the operator 112 with additional information in order to prevent or mitigate misalignment of operator situational awareness that can threaten mission success.

As a particular example of this, if it is determined that the operator 112 is likely to override the autonomy 116 because of rational cognitive reasoning 352, one output might be further explanation of a strategy of the autonomy 116 to help the operator 112 understand why the autonomy 116 performs its actions. With increased understanding, the operator 112 may be less likely to override the autonomy 116 in the future. On the other hand, if it is determined that the operator 112 is likely to override or not override because of high stress and or workload, it might not be a good idea to give more information to the operator 112, which may cause further stress or workload.

Although FIG. 3 illustrates one example of a framework 300 for predicting MUM-T autonomy overrides, various changes may be made to FIG. 3. For example, various components in the framework 300 may be combined, further subdivided, replicated, rearranged, or omitted and additional components may be added according to particular needs.

Figure 4:
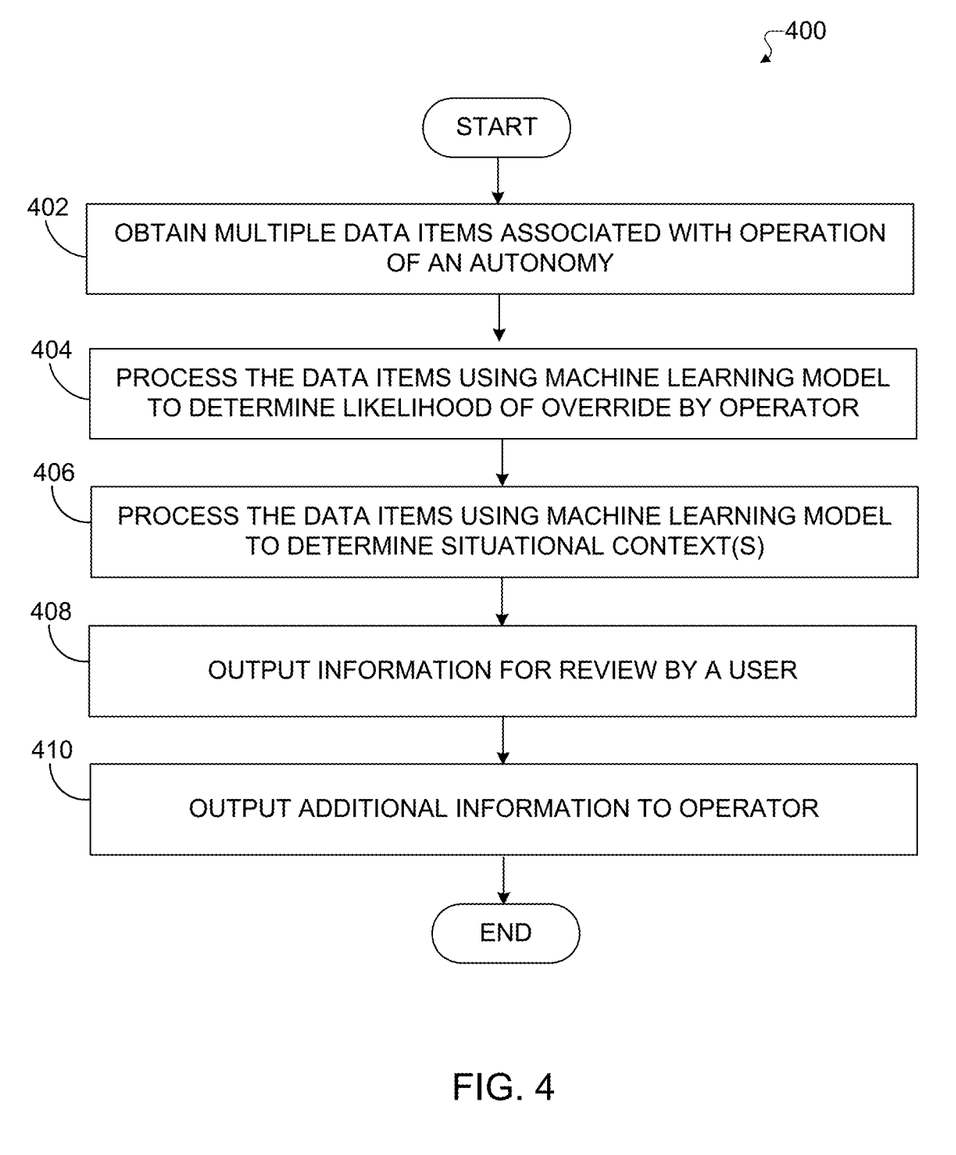
FIG. 4 illustrates an example method for predicting MUM-T autonomy overrides according to this disclosure.

FIG. 4 illustrates an example method 400 for predicting MUM-T autonomy overrides according to this disclosure. For ease of explanation, the method 400 of FIG. 4 may be described as being performed using the one or more devices 200 of FIG. 2 in the system 100 of FIG. 1 based on the framework 300 of FIG. 3. However, the method 400 may involve the use of any suitable device(s) in any suitable system(s).

As shown in FIG. 4, multiple data items are obtained from multiple heterogeneous data sources including at least one sensor at step 402. This may include, for example, the server 106 obtaining multiple ones of the inputs 302-326 from various heterogeneous data sources. The multiple data items are related to operation of an autonomy, such as an autonomy associated with a vehicle or other MUM-T system.

The multiple data items are processed using a machine learning model to determine a likelihood that an operator will override an action of the autonomy during the operation of the autonomy and at least one reason for the likelihood at step 404. This may include, for example, the server 106 using the ML model 330 to process the data items and determine one or more of the likelihoods to override 352-356. The multiple data items are processed using the machine learning model to determine at least one situational context associated with the likelihood that the operator will override the action of the autonomy at step 406. This may include, for example, the server 106 using the ML model 330 to process the data items and determine one or more of the situational contexts 332-340.

Information for review by a user is output at step 408. This may include, for example, the server 106 outputting the information to a graphical user interface or a report for review by a user. The information can include the likelihood that the operator will override an action of the autonomy, the reason(s) for the likelihood, the situational context(s) associated with the likelihood, or a combination of these. Additional information about the likelihood is output to the operator at step 410. This may include, for example, the server 106 outputting additional information to the operator 112 for increased operator understanding or training. In some cases, the additional information is selected to convince the operator to not override the autonomy, to ensure the operator is properly informed to make an appropriate decision, or a combination of these.

Although FIG. 4 illustrates one example of a method 400 for predicting MUM-T autonomy overrides, various changes may be made to FIG. 4. For example, while shown as a series of steps, various steps in FIG. 4 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining multiple data items from multiple heterogeneous data sources including at least one sensor, the multiple data items related to operation of an autonomy;
   processing the multiple data items using a machine learning model to determine (i) a likelihood that an operator associated with the autonomy will override an action of the autonomy during the operation of the autonomy and (ii) at least one situational context associated with the likelihood that the operator will override the action of the autonomy, the at least one situational context representing at least one reason why the operator would be likely to override the action of the autonomy; and
   outputting the likelihood and the at least one situational context for review by the operator;
   wherein the autonomy comprises a manned-unmanned teaming (MUM-T) autonomy configured to perform at least one pilot operation in a manned aircraft, and wherein the action of the autonomy is the at least one pilot operation.

2. The method of claim 1, wherein the data items comprise at least one measurement of a behavior or a physiological characteristic of the operator measured by the at least one sensor.

3. The method of claim 1, further comprising:
   processing the multiple data items using the machine learning model to determine at least one reason for the likelihood that the operator will override the action of the autonomy; and
   outputting the at least one reason for review by the operator.

4. The method of claim 3, wherein the at least one reason comprises at least one of: rational cognitive reasoning of the operator, operator belief about a reliability of the autonomy, and operator stress or workload.

5. The method of claim 1, further comprising:
   outputting additional information about the likelihood to the operator, the additional information selected to convince the operator to not override the autonomy.

6. The method of claim 1, further comprising:
   outputting additional information about the likelihood to the operator, wherein the additional information is selected to ensure the operator is properly informed to make a decision.

7. A device comprising:
   at least one processor configured to:
   obtain multiple data items from multiple heterogeneous data sources including at least one sensor, the multiple data items related to operation of an autonomy;
   process the multiple data items using a machine learning model to determine (i) a likelihood that an operator associated with the autonomy will override an action of the autonomy during the operation of the autonomy and (ii) at least one situational context associated with the likelihood that the operator will override the action of the autonomy, the at least one situational context representing at least one reason why the operator would be likely to override the action of the autonomy; and
   output the likelihood and the at least one situational context for review by the operator;
   wherein the autonomy comprises a manned-unmanned teaming (MUM-T) autonomy configured to perform at least one pilot operation in a manned aircraft, and wherein the action of the autonomy is the at least one pilot operation.

8. The device of claim 7, wherein the data items comprise at least one measurement of a behavior or a physiological characteristic of the operator measured by the at least one sensor.

9. The device of claim 7, wherein the at least one processor is further configured to:
   process the multiple data items using the machine learning model to determine at least one reason for the likelihood that the operator will override the action of the autonomy; and
   output the at least one reason for review by the operator.

10. The device of claim 9, wherein the at least one reason comprises at least one of: rational cognitive reasoning of the operator, operator belief about a reliability of the autonomy, and operator stress or workload.

11. The device of claim 7, wherein the at least one processor is further configured to:
    output additional information about the likelihood to the operator, the additional information selected to convince the operator to not override the autonomy.

12. The device of claim 7, wherein the at least one processor is further configured to output additional information about the likelihood to the operator, the additional information selected to ensure the operator is properly informed to make a decision.

13. A non-transitory computer readable medium containing instructions that when executed cause at least one processor to:
    obtain multiple data items from multiple heterogeneous data sources including at least one sensor, the multiple data items related to operation of an autonomy;
    process the multiple data items using a machine learning model to determine (i) a likelihood that an operator associated with the autonomy will override an action of the autonomy during the operation of the autonomy and (ii) at least one situational context associated with the likelihood that the operator will override the action of the autonomy, the at least one situational context representing at least one reason why the operator would be likely to override the action of the autonomy; and
    output the likelihood and the at least one situational context for review by the operator;
    wherein the autonomy comprises a manned-unmanned teaming (MUM-T) autonomy configured to perform at least one pilot operation in a manned aircraft, and wherein the action of the autonomy is the at least one pilot operation.

14. The non-transitory computer readable medium of claim 13, wherein the data items comprise at least one measurement of a behavior or a physiological characteristic of the operator measured by the at least one sensor.

15. The non-transitory computer readable medium of claim 13, wherein the instructions when executed further cause the at least one processor to:
process the multiple data items using the machine learning model to determine at least one reason for the likelihood that the operator will override the action of the autonomy; and
output the at least one reason for review by the operator.

16. The non-transitory computer readable medium of claim 15, wherein the at least one reason comprises at least one of: rational cognitive reasoning of the operator, operator belief about a reliability of the autonomy, and operator stress or workload.

17. The non-transitory computer readable medium of claim 13, wherein the instructions when executed further cause the at least one processor to:
output additional information about the likelihood to the operator, the additional information selected to ensure the operator is properly informed to make a decision.

18. The non-transitory computer readable medium of claim 13, wherein the instructions when executed further cause the at least one processor to output additional information about the likelihood to the operator, the additional information selected to convince the operator to not override the autonomy.

19. The method of claim 1, wherein the likelihood that the operator associated with the autonomy will override the action of the autonomy during the operation of the autonomy quantifies autonomy under-reliance.

20. The device of claim 7, wherein the likelihood that the operator associated with the autonomy will override the action of the autonomy during the operation of the autonomy quantifies autonomy under-reliance.

* * * * *